United States Patent
Jang

(10) Patent No.: US 9,729,846 B2
(45) Date of Patent: Aug. 8, 2017

(54) METHOD AND APPARATUS FOR GENERATING THREE-DIMENSIONAL IMAGE REPRODUCED IN A CURVED-SURFACE DISPLAY

(71) Applicant: SAMSUNG ELECTRONICS, CO., LTD., Suwon-si, Gyeonggi-do (KR)

(72) Inventor: Sung-chang Jang, Suwon-si (KR)

(73) Assignee: Samsung Electronics, Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/972,852

(22) Filed: Dec. 17, 2015

(65) Prior Publication Data

US 2016/0180577 A1 Jun. 23, 2016

(30) Foreign Application Priority Data

Dec. 17, 2014 (KR) ........................ 10-2014-0182551

(51) Int. Cl.
*G06T 15/08* (2011.01)
*H04N 13/00* (2006.01)
*H04N 13/04* (2006.01)

(52) U.S. Cl.
CPC ......... *H04N 13/0022* (2013.01); *G06T 15/08* (2013.01); *H04N 13/0402* (2013.01)

(58) Field of Classification Search
CPC . G06T 15/08; H04N 13/0402; H04N 13/0022
See application file for complete search history.

(56) References Cited

U.S. PATENT DOCUMENTS

| 8,290,244 B2 | 10/2012 | Ha | |
|---|---|---|---|
| 2011/0126159 A1 | 5/2011 | Ko et al. | |
| 2012/0194639 A1* | 8/2012 | Jun | H04N 5/265 348/42 |
| 2015/0185761 A1* | 7/2015 | Song | G06F 1/1601 361/679.21 |
| 2015/0381959 A1* | 12/2015 | Lee | H04N 13/0022 382/154 |

FOREIGN PATENT DOCUMENTS

| KR | 10-0667810 | 1/2007 |
|---|---|---|
| KR | 10-2011-0062983 | 6/2011 |
| KR | 10-2011-0130595 | 12/2011 |
| KR | 10-2014-0052570 | 5/2014 |

\* cited by examiner

*Primary Examiner* — Tapas Mazumder
(74) *Attorney, Agent, or Firm* — Nixon & Vanderhye P.C.

(57) ABSTRACT

An apparatus for generating a three-dimensional (3D) image reproduced on a curved-surface display panel is disclosed. The apparatus may include a controller for determining depth information including at least one ratio of a left depth level to a right depth level, based at least in part on at least one curvature of the curved-surface display panel; and an image processor for generating the 3D image reproduced on the curved-surface display panel using the determined depth information.

15 Claims, 13 Drawing Sheets

| | a | b | c | d | e | f | g |
|---|---|---|---|---|---|---|---|
| CURVATURE | 0.3 | 0.2 | 0.1 | 0 | 0.1 | 0.2 | 0.3 |
| ADDITIONAL DEPTH INFORMATION | 0.7:1 | 0.8:1 | 0.9:1 | 1:1 | 1:0.9 | 1:0.8 | 1:0.7 |

FIG. 2A
FIG. 2B
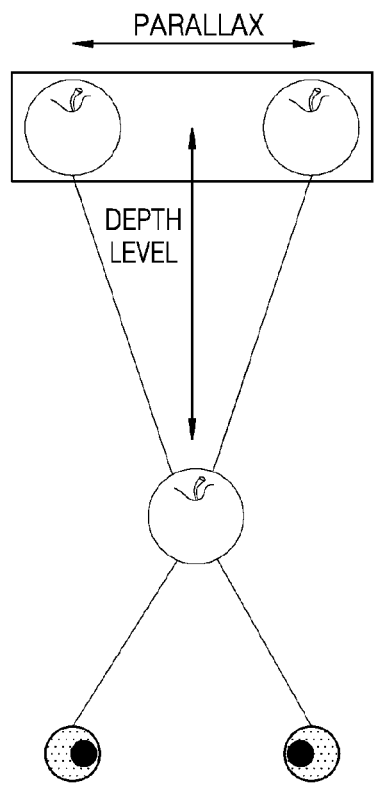
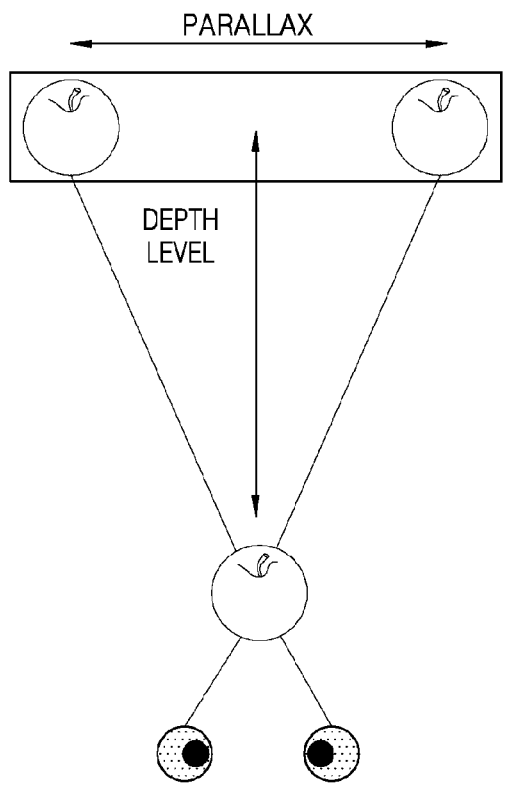

| | a | b | c | d | e | f | g |
|---|---|---|---|---|---|---|---|
| CURVATURE | 0.3 | 0.2 | 0.1 | 0 | 0.1 | 0.2 | 0.3 |
| ADDITIONAL DEPTH INFORMATION | 0.7:1 | 0.8:1 | 0.9:1 | 1:1 | 1:0.9 | 1:0.8 | 1:0.7 |

| | a | b | c | d | e | f | g |
|---|---|---|---|---|---|---|---|
| CURVATURE | 0% | 0% | 0% | 0% | 0% | 0% | 0% |
| ADDITIONAL DEPTH INFORMATION | 1:1 | 1:1 | 1:1 | 1:1 | 1:1 | 1:1 | 1:1 |

| | a | b | c | d | e | f | g |
|---|---|---|---|---|---|---|---|
| CURVATURE | 5% | 3% | 1% | 0% | 1% | 3% | 5% |
| ADDITIONAL DEPTH INFORMATION | 1.5:1 | 1.3:1 | 1.1:1 | 1:1 | 1.1:1 | 1.3:1 | 1.5:1 |

| | a | b | c | d | e | f | g |
|---|---|---|---|---|---|---|---|
| CURVATURE | 7% | 5% | 3% | 0% | 3% | 5% | 7% |
| ADDITIONAL DEPTH INFORMATION | 1.7:1 | 1.5:1 | 1.3:1 | 1:1 | 1.3:1 | 1.5:1 | 1.7:1 |

METHOD AND APPARATUS FOR GENERATING THREE-DIMENSIONAL IMAGE REPRODUCED IN A CURVED-SURFACE DISPLAY

CROSS-REFERENCE TO RELATED APPLICATION

This application is based on and claims priority under 35 U.S.C. §119 to Korean Patent Application No. 10-2014-0182551, filed on Dec. 17, 2014, in the Korean Intellectual Property Office, the disclosure of which is incorporated by reference herein in its entirety.

BACKGROUND

1. Field

The disclosure relates to methods and apparatuses for generating a three-dimensional (3D) image reproduced in a curved-surface display, and for example, to methods and apparatuses for improving a 3D effect of a 3D image reproduced in a curved-surface display.

2. Description of Related Art

A three-dimensional (3D) display uses a tool such as a micro-polarizer in the form of a film, a barrier, or a lenticular lens in addition to a two-dimensional (2D) flat display, and thus an image having a different parallax for a left eye and a right eye of a user is projected to provide a depth to an image displayed. The 3D display using the aforementioned method may be categorized into a stereo 3D display and a multi-view 3D display according to the number of viewpoints presented by a display. The stereo 3D display displays images of two different viewpoints, and the multi-view 3D display displays images of three or more viewpoints.

In a flat-surface display panel, the stereo display sets one depth level with respect to all display areas.

However, when only one depth level is set for a 3D image with respect to all display areas in a curved-surface display, the depth level may differ from a depth intended when producing the 3D image.

SUMMARY

Methods and apparatuses for improving a three-dimensional (3D) effect of a 3D image reproduced in a curved-surface display are provided.

Additional aspects will be set forth in part in the description which follows and, in part, will be apparent from the description.

According to an aspect of an example embodiment, an apparatus for generating a three-dimensional (3D) image reproduced in a curved-surface display panel includes a controller configured to determine depth information including at least one ratio of a left depth level to a right depth level, based at least in part on at least one curvature of the curved-surface display panel; and an image processor configured to generate the 3D image reproduced in the curved-surface display panel using the determined depth information.

In some examples, the left depth level and the right depth level are different from each other.

In some examples, the at least one ratio of the left depth level to the right depth level is set based on the at least one curvature and an aspect ratio of the curved-surface display panel.

In some examples, the at least one ratio of the left depth level to the right depth level is set to be different with respect to each area of the curved-surface display panel.

In some examples, the image processor is configured to horizontally move a left-eye image and a right-eye image of the 3D image to generate the 3D image using the at least one ratio of the left depth level to the right depth level.

In some examples, the apparatus further includes a user interface via which a preset curvature is input when a curvature of the curved-surface display panel is changeable, wherein the controller is configured to determine depth information corresponding to the input preset curvature, and the image processor is configured to adjust the left depth level and the right depth level of the 3D image based on the determined depth information corresponding to the preset curvature.

According to an aspect of another example embodiment, a method of generating a three-dimensional (3D) image reproduced in a curved-surface display panel includes determining depth information including at least one ratio of a left depth level to a right depth level, based at least in part on at least one curvature of a curved-surface display panel; and generating a 3D image reproduced in the curved-surface display panel by using the determined depth information.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIGS. 2A and 2B are diagrams illustrating an example relation between parallax and a depth;

DETAILED DESCRIPTION

Figure 1:
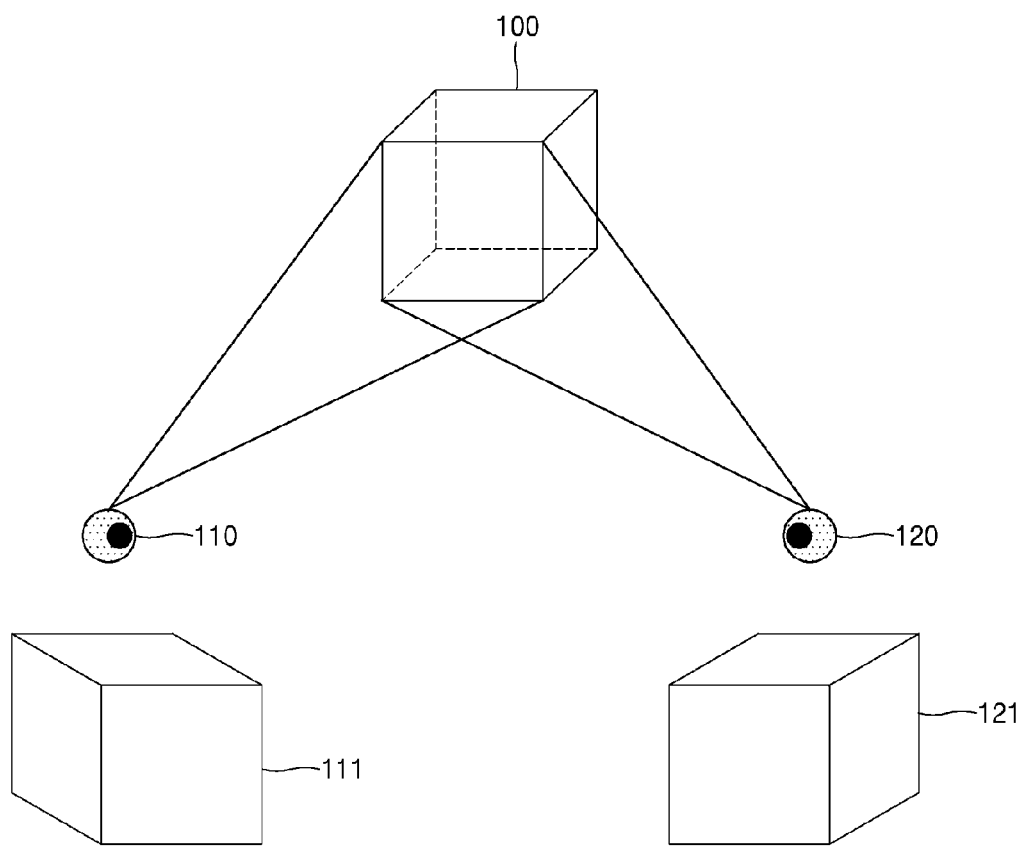
FIG. 1 is a diagram illustrating an example principle of embodying a three-dimensional (3D) image.

Hereinafter, a detailed description of the disclosure will be provided by explaining example embodiments with reference to the attached drawings. Like reference numerals in the drawings denote like elements. Descriptions will be provided below for better understanding of the disclosure. In the description, certain explanations of related art are omitted when it is deemed that they may unnecessarily obscure the disclosure.

Terms used herein will be briefly described, and then the disclosure will be described in greater detail.

Most of the terms used herein are general terms that have been widely used in the technical art to which the disclosure pertains. However, some of the terms used herein may be created reflecting intentions of technicians in this art, precedents, or new technologies. Some of the terms used herein may be arbitrarily chosen. In this case, these terms are defined in detail below. Accordingly, the specific terms used herein should be understood based on the meanings thereof and the context of the disclosure.

Throughout the disclosure, when a portion "includes" an element, another element may be further included, rather than excluding the existence of the other element, unless otherwise described. The terms, such as 'unit' '-or/er' or 'module', should be understood as a unit that processes at least one function or operation and that may be embodied by hardware (e.g., circuitry), software, or a combination thereof.

Throughout the disclosure, a depth may, for example, refer to a value for providing a three-dimensional (3D) effect to objects of a 3D image. In this regard, a depth level may, for example, refer to a degree of depth.

In the disclosure, a depth level may, for example, refer to how far a left-eye image or a right-eye image for objects of a 3D image moves to the left or right.

Throughout the disclosure, depth information may include, for example, depths of a part or all of a 3D image. For example, the depth information may include a depth of each object of a 3D image.

FIG. 1 is a diagram illustrating an example principle of embodying a 3D image.

Referring to FIG. 1, when a hexahedron 100 is viewed with naked eyes, a left eye 110 may view a two-dimensional (2D) image 111, and the right eye 120 may view a 2D image 121.

When the 2D image 111 is seen by the left eye 110, and the 2D image 121 is seen by the right eye 120, a person may sense he/she is in reality viewing the hexahedron 100.

To embody a 3D image, an image for a left eye (hereinafter referred to as a left-eye image) and an image for a right eye (hereinafter referred to as a right-eye image) with respect to one object may be respectively seen by the left eye and the right eye, via a display unit.

For example, using a 2D flat display with a micro-polarizer, a barrier, or a lenticular lens in the form of, for example, a film, a 3D display may provide a left-eye image and a right-eye image having a different parallax to a user and thus may embody a 3D effect of an image.

FIGS. 2A and 2B are diagrams illustrating an example of a relation between parallax and a depth. FIG. 2A illustrates a case in which parallax between a left-eye image and a right-eye image is small, and FIG. 2B illustrates a case in which parallax between a left-eye image and a right-eye image is large.

When the parallax is small, a depth is relatively small as illustrated in FIG. 2A, and when the parallax is large, a depth is relatively large as illustrated in FIG. 2B.

Therefore, a depth of an object may be adjusted by adjusting the parallax, which is a distance between a left-eye image and a right-eye image with respect to the object. For example, when a depth of an object of an image is not sufficient, the parallax may increase, and when a depth is excessive, the parallax may be decreased so that the depth may be properly adjusted.

Figure 3A:
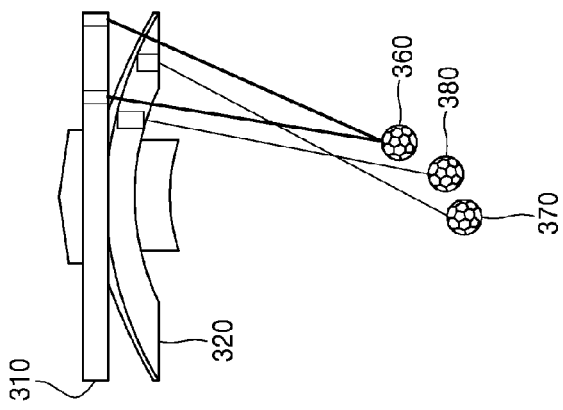
FIGS. 3A to 3C are diagrams illustrating an example conceptual view illustrating a difference in depth between images of a flat-surface display and a curved-surface display.
Figure 3B:
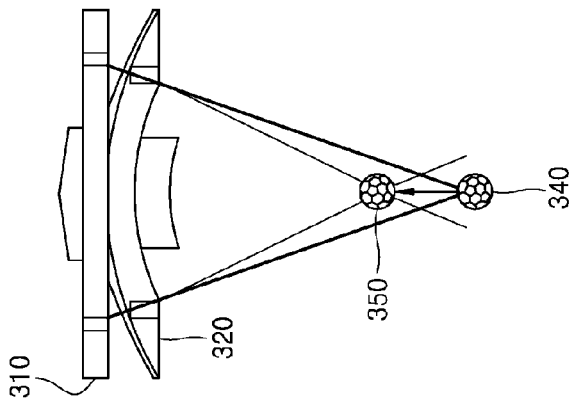
Figure 3C:
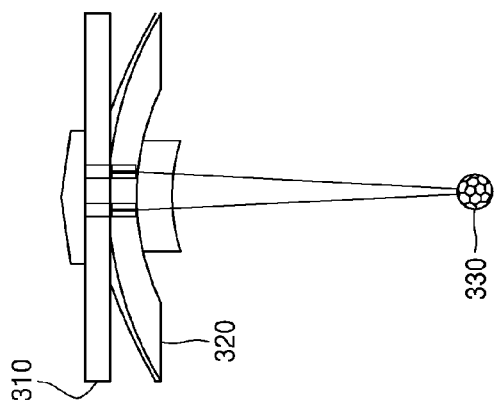

FIGS. 3A to 3C are diagrams illustrating an example of a difference in depth between images of a flat-surface display and a curved-surface display.

In a case of a flat-surface display panel, the same depth level is set for any area of the flat-surface display panel. However, when the same depth level is set for any display area of a curved-surface display, a 3D effect may be distorted. Therefore, as set forth in greater detail below, depth information for a curved-surface display may take into account the curvature of the curved-surface display panel. In certain non-limiting example embodiments discussed herein, the depth information taking into account the curvature of the curved-surface display may be depth information used and/or provided in addition to depth information of the flat-surface display to correct for the curvature of the curved-surface display. The depth information may, in other non-limiting examples, include depth information of the flat-surface display and the curved-surface display in a given depth value, or any combination of depth information that may or may not include depth information of the flat-surface display but takes into account the curvature of the curved-surface display. For ease of explanation, the term additional depth information may be used in the following description, but one skilled in the art will understand that this term may refer to any type or combination of depth information that may or may not include depth information of a flat-surface display panel, and that can be used to take into account a curvature of a curved-surface display.

Referring to FIGS. 3A to 3C, a flat-surface display panel 310 and a curved-surface display panel 320 are illustrated.

FIG. 3A illustrates a depth of an image from each center portion of the flat-surface display panel 310 and the curved-surface display panel 320.

As illustrated in FIG. 3A, when a depth to be embodied is small, for example, when the parallax between a left-eye image and a right-eye image is small, there may be little difference between a curved-surface display and a flat-surface display.

However, as illustrated in FIG. 3B, when a depth to be embodied is large, for example, when the parallax between a left-eye image and a right-eye image is large, there may be a larger difference between a curved-surface display and a flat-surface display.

As a display panel bends in a curved-surface display, a relative distance between a left-eye image and a right-eye image changes and thus, parallax error may occur.

For example, when the parallax is set to be large for a large depth, if the parallax of a 3D image of a curved-surface display is set to be the same as the parallax of a flat-surface display, a depth of the 3D image of the curved-surface display decreases compared to or relative to a depth of the flat-surface display.

For example, when the parallax between a left-eye image and a right-eye image is large, and a depth of the curved-surface display panel 320 is set to be the same as a depth of the flat-surface display panel 310, a 3D image 350 of the curved-surface display 320 may have a smaller depth than a 3D image 340 of the flat-surface display 310.

When a depth needs to be large, the depth of a curved-surface display may be corrected using a larger parallax than that of a flat-surface display.

According to an example, with respect to a central portion of a curved-surface display, additional depth information based on a curvature may be additionally set so that the same depth as a depth of a flat-surface display may be secured.

For example, the depth information may include an additional depth determined based on a curvature of a curved-surface display and added to a depth, which is applied to embody a 3D effect of a 3D image in a flat-surface display.

When a depth of a 3D image is embodied in a peripheral portion of a curved-surface display, a problem related to a depth of an image such as flickering, screen jittering, image shaking, or the like may occur.

FIG. 3C illustrates a view showing a different in depth between peripheral portions of the flat-surface display panel 310 and the curved-surface display panel 320.

As illustrated in FIG. 3C, when existing depth information is applied to left and right peripheral portions of the curved-surface display panel 320, a left-eye image 380 and a right-eye image 370 for embodying a 3D image may not displayed at the same spot and thus, an image flickering may occur or be perceived.

To overcome the aforementioned problem, in an example embodiment, the left and right peripheral portions of a curved-surface display may improve a 3D effect of the curved-surface display using additional depth information. Additional descriptions thereof will be provided below with reference to FIG. 4.

Figure 4:
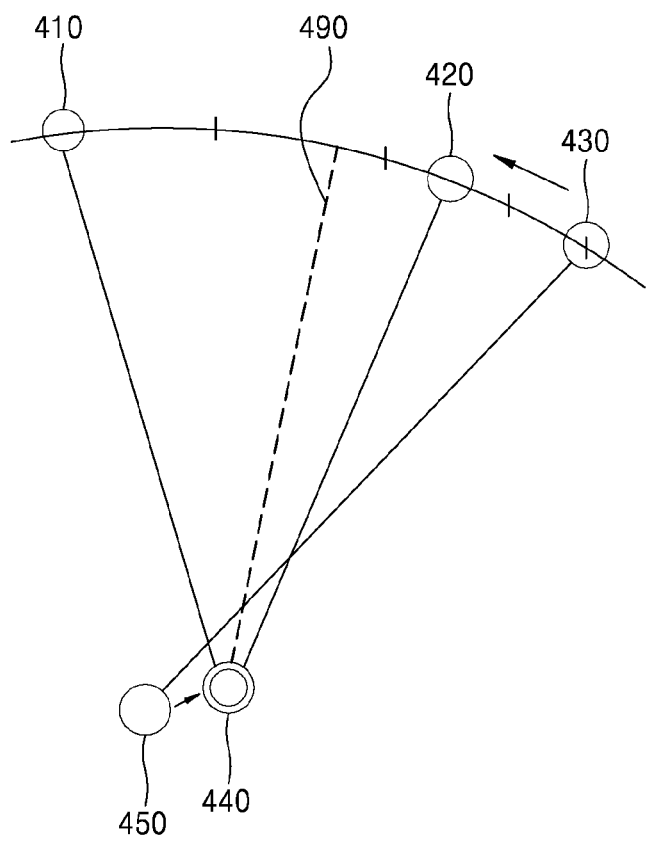
FIG. 4 is a diagram illustrating an example in which an additional depth is applied to a right area of a curved-surface display.

FIG. 4 is a diagram illustrating an example in which additional depth is applied to a right area of a curved-surface display.

Referring to FIG. 4, a left-eye image 410 and a right-eye image 430 to which an identical depth level with respect to a center line 490 is applied are illustrated in the right area of the curved-surface display.

Unlike a 3D image displayed in a flat-surface display panel, a 3D image displayed in a curved-surface display panel may obtain a proper 3D effect when additional depth information as well as basic depth information are applied to the 3D image.

For example, a synthesized image of the left-eye image 410 and the right-eye image 430 is not displayed as one image 440 due to a characteristic of a curved-surface display but may instead be displayed as two images 440 and 450, and thus, problems such as an image flickering may occur or be perceived.

A right-eye image 430 may be adjusted to right-eye image 420 by reducing parallax of a right-eye image by a predetermined degree in a right area of a curved-surface display may be used, and thus, a synthesized image of the left-eye image 410 and the adjusted right-eye image 420 may be shown as the one image 440.

As described above, a 3D effect may be improved by reducing parallax of at least one of a left-eye image and a right-eye image in a peripheral area of a curved-surface display.

For example, a 3D effect may be improved by reducing an amount of rightward movement of a right-eye image in a right area of a curved-surface display.

A 3D effect may also be improved by reducing an amount of leftward movement of a left-eye image in a left area of a curved-surface display.

Therefore, throughout the disclosure, applying an additional depth may, for example, refer to adjusting a depth to be applied to a left-eye image and/or a right-eye image in a flat-surface display and thus applying the depth to a left-image and/or a right-eye image in a curved-surface display.

Depth levels of objects displayed in each area of a curved-surface display panel may be set to be different from each other and, the additional depth may be applied thereto based on a curvature corresponding to each area of the curved-surface display panel.

According to an example embodiment, the additional depth information may include, for example, a ratio of a left depth level to a right depth level in each area of a curved-surface display.

For example, the additional depth information may be set by determining that an amount of leftward movement of a left-eye image (hereinafter referred to as a left depth level) and an amount of rightward movement of a right-eye image (hereinafter referred to as a right depth level) that are different from each other.

According to an example embodiment, each of a left-eye image and a right-eye image of a 3D image may move horizontally using a ratio of a left depth level to a right depth level in each area of a curved-surface display, and thus, an improved 3D image may be generated.

For example, it is assumed that, in order to set a depth of a particular area of a flat-surface display, a left-eye image moves to the left by 20 pixels and a right-eye image moves to the right by 20 pixels.

In this example, if an appropriate ratio of a left depth level to a right depth level is 1:0.8 for a particular area of a curved-surface display, additional depth information may, for example, be applied by moving a left-eye image to be reproduced in the particular area to the left by 20 pixels, and moving a right-eye image to the right by 16 pixels.

Figure 5:
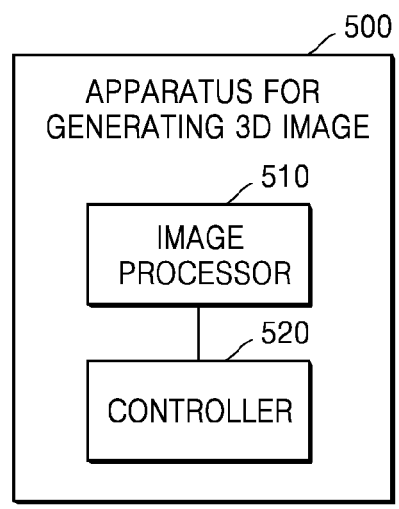
FIG. 5 is a block diagram illustrating an example apparatus for generating a 3D image reproduced in a curved-surface display.

FIG. 5 is a block diagram illustrating an example apparatus for generating a 3D image reproduced in a curved-surface display.

Referring to FIG. 5, an apparatus 500 for generating a 3D image may include, for example, an image processor 510 and a controller 520. However, not all of the components illustrated in FIG. 5 may be necessary. More or less components than those illustrated in FIG. 5 may be used to embody the apparatus 500 for generating a 3D image.

Hereinafter, descriptions of the components will be provided.

The controller 520 may be configured to generally control overall operations of the apparatus 500 generating a 3D image. The controller 520 may be configured to collect additional depth information based on a curvature of a curved-surface display panel.

A curved-surface display panel may, for example, include one or more curvatures. For example, in some cases of curved-surface display panels, a curvature of a central portion may be 0%, and a curvature of a peripheral portion may increase, for example, from 1% to 3% or more.

Additional depth information may include, for example, one or more ratios of a left depth level to a right depth level.

For example, the additional depth information may include different ratios of a left depth level to a right depth level depending on an area of a curved-surface display panel. For example, the additional depth information may include a ratio of 1:1 in a central portion of a curved-surface display panel, a ratio of 1:0.7 in a right portion thereof, and a ratio of 0.7:1 in a left portion thereof. More detailed descriptions thereof will be provided with reference to FIG. 8.

The image processor 510 may be configured to generate a 3D image reproduced in a curved-surface display panel using the additional depth information.

For example, the image processor 510 may be configured to adjust depth information using a ratio of a left depth level to a right depth level, which is included in additional depth information.

For example, when a left-eye image moves to left by 3 pixels and a right-eye image moves to right by 3 pixels in order to generate a depth in a 3D image of a flat-surface display panel, the image processor 510 may adjust the amount of movement of a left-eye image and a right-eye image in a curved-surface display panel using a ratio of a left depth level to a right depth level, which is included in additional depth information.

For example, if a left-eye image moves to the left by 3 pixels and a right-eye image moves to the right by 3 pixels in order to generate a 3D effect in a right panel of a flat-surface display, the image processor 510 may be configured to move a left-eye image to the left by 3 pixels and a right-eye image to the right by 2 pixels in order to generate the same 3D effect in a right panel of a curved-surface display.

The image processor 510 may improve a 3D effect of a 3D image by being configured to move a left-eye image to the left by 2 pixels and moving a right-eye image to the right by 3 pixels in a left panel of the curved-surface display.

Figure 6:
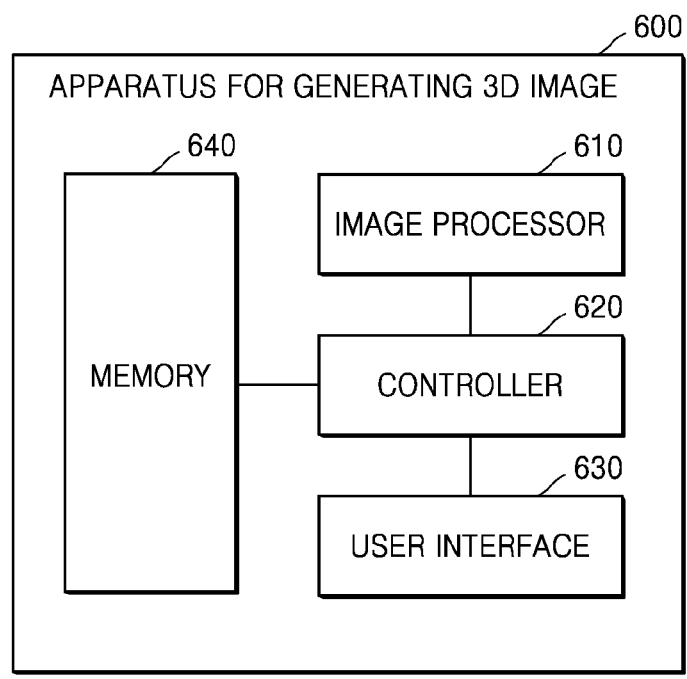
FIG. 6 is a block diagram illustrating an example apparatus for generating a 3D image.

FIG. 6 is a block diagram illustrating an example apparatus for generating a 3D image.

Referring to FIG. 6, an apparatus 600 for generating a 3D image may include, for example, an image processor 610, a controller 620, a user interface 630, and a memory 640.

The image processor 610 and the controller 620 may respectively correspond to the image processor 510 and the controller 520 of FIG. 5.

The controller 620 may be configured to generally control overall operations of the apparatus 500 for generating a 3D image. For example, the controller 620 may be configured to execute programs stored in the memory 640 and thus control the image processor 610, the controller 620, the user interface 630, the memory 640, and the like. In addition, the controller 620 may be configured to collect additional depth information on each area of a curved-surface display from the memory 640.

The user interface 630 may be configured to receive a preset curvature from a user. The user interface 630 may, for example, be an input device, for example, a keyboard, a mouse, a trackball, a touchpad, a remote controller, or the like.

According to an example embodiment, a user may operate the user interface 630 to adjust a curvature of a curved-surface display panel. For example, a curved-surface display panel may include a small curvature mode, a medium curvature mode, and a large curvature mode. When a user selects a small curvature mode, a curved-surface display panel may be adjusted to be more flat, and when a user selects a large curvature mode, a curved-surface display panel may be adjusted to be more curved.

The controller 620 may be configured to collect additional depth information from the memory 640 based on an adjusted curvature of a curved-surface display panel.

The memory 640 may include, for example, additional depth information on each area of a curved-surface display. For example, the memory 640 may store preferred ratios of a left depth level to a right depth level in areas of a curved-surface display panel in a table form. More descriptions thereof will be provided with reference to FIGS. 8 and 12.

Figure 7:
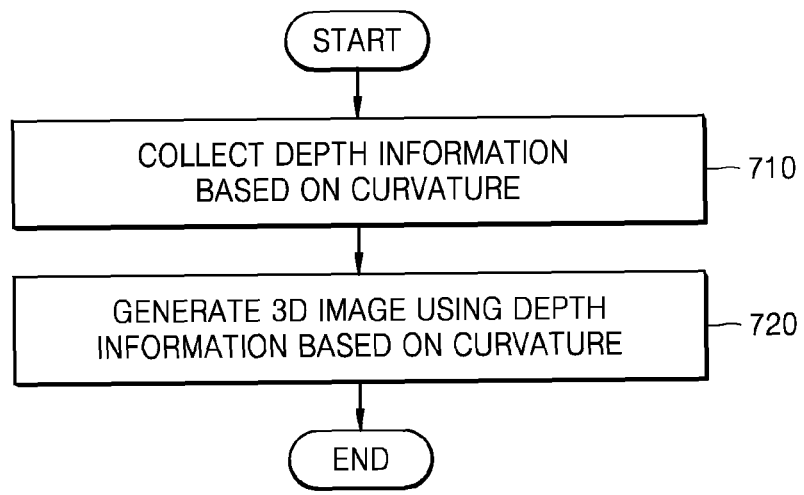
FIG. 7 is a flowchart illustrating an example method of generating a 3D image.

FIG. 7 is a flowchart illustrating an example method of generating a 3D image.

In operation 710, the apparatus 500 for generating a 3D image may collect depth information based on at least one curvature of a curved-surface display panel. The depth information may include at least one ratio of a left depth level to a right depth level based on at least one curvature of a curved-surface display panel.

In operation 720, the apparatus 500 for generating a 3D image may generate a 3D image reproduced in a curved-surface display panel by using collected depth information.

When parallax is large with respect to an object in a central portion of a curved-surface display panel, the apparatus 500 for generating a 3D image according to an example embodiment may apply a depth in addition to that of a flat-surface display panel to embody a 3D effect at a same level as that of a flat-surface display panel.

In addition, the apparatus 500 for generating a 3D image according to an example embodiment may apply a different ratio of a left depth level to a right depth level in each of areas with respect to an object in a peripheral portion of a curved-surface display panel so that a mismatching problem of a 3D effect of a 3D image in a peripheral portion of a curved-surface display panel may be reduced.

Figures 8A, 8B:
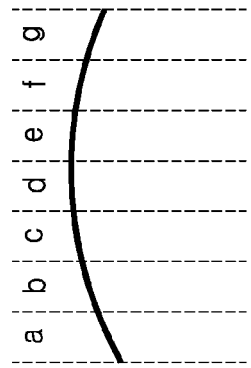
FIGS. 8A and 8B are diagrams illustrating an example of how additional depth information is applied to each area of a curved-surface display.

FIG. 8A is a diagram illustrating an example of how additional depth information is applied to each area of a curved-surface display. FIG. 8B is a table illustrating example curvature and depth information for each area of a curved-surface display panel.

FIG. 8A illustrates an example curved-surface display panel horizontally divided into 7 areas.

FIG. 8B illustrates a table of a curvature of depth information on each area of a curved-surface display panel that may be used in addition to the depth information of a flat-surface display panel, which may be referred to as additional depth information.

According to an example, additional depth information may have a different ratio of a left depth level to a right depth level in each area based on a curvature of each area of a curved-surface display panel.

Referring to FIG. 8B, a curvature is 0 in area d, which is, for example, a central portion of a curved-surface display panel, and thus a ratio of a left depth level to a right depth level is 1:1. However, ratios of a left depth level to a right depth level are different in areas a, b, c, e, f, and g where curvatures thereof are positive.

A curved-surface display panel is divided into 7 areas in this example, but embodiments are not limited thereto. In some examples, a curved-surface display panel may be divided into hundreds of areas having respective additional depth information to improve performance.

Figure 9A:
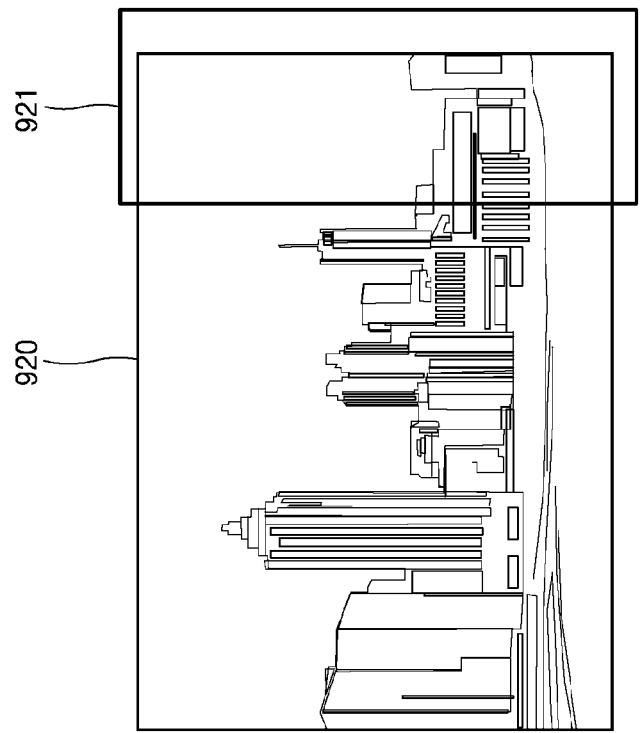
FIGS. 9A and 9B are diagrams illustrating a difference in additional depth information with respect to an aspect ratio.
Figure 9B:
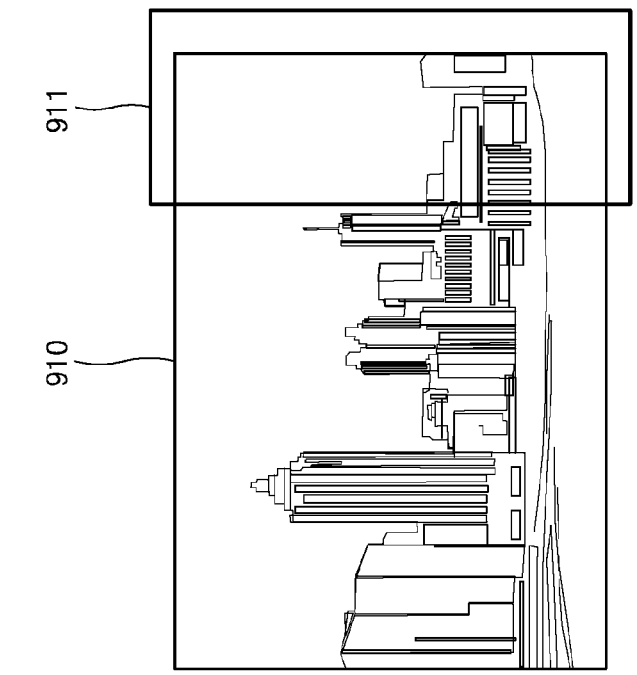

FIGS. 9A and 9B are diagrams illustrating an example difference in additional depth information with respect to an aspect ratio.

A left curved-surface display panel 910 has an aspect ratio of 21:9, and a right curved-surface display panel 920 has an aspect ratio of 16:9.

Sizes of the curved-surface display panels 910 and 920 are the same but aspect ratios thereof are different.

Here, a curvature of a peripheral area 911 of the left curved-surface display panel 910 may be different from a curvature of a peripheral area 921 of the right curved-surface display panel 920.

Additional depth information in the peripheral areas 911 and 921, for example a ratio of a left depth level to a right depth level may be different. For example, a ratio of a left depth level to a right depth level in the peripheral area 911 of the left curved-surface display panel 910 may be 1:0.9, and a ratio of a left depth level to a right depth level in the peripheral area 921 of the right curved-surface display panel 920 may be 1:0.95. The sizes of the curved-surface display panels 910 and 920 are the same, but a horizontal length of the right curved-surface display panel 920 is smaller than that of the left curved-surface display panel 910, and thus, the right curved-surface display panel 920 has a smaller curvature in an edge portion thereof.

A ratio of a left depth level to a right depth level in each area of a curved-surface display panel may be set based on an aspect ratio of the curved-surface display panel.

When an aspect ratio of a 3D image reproduced in a curved-surface display panel is changed, the aforementioned setting may be applied in the same manner. More detailed descriptions will be provided with reference to FIG. 13.

Figure 10:
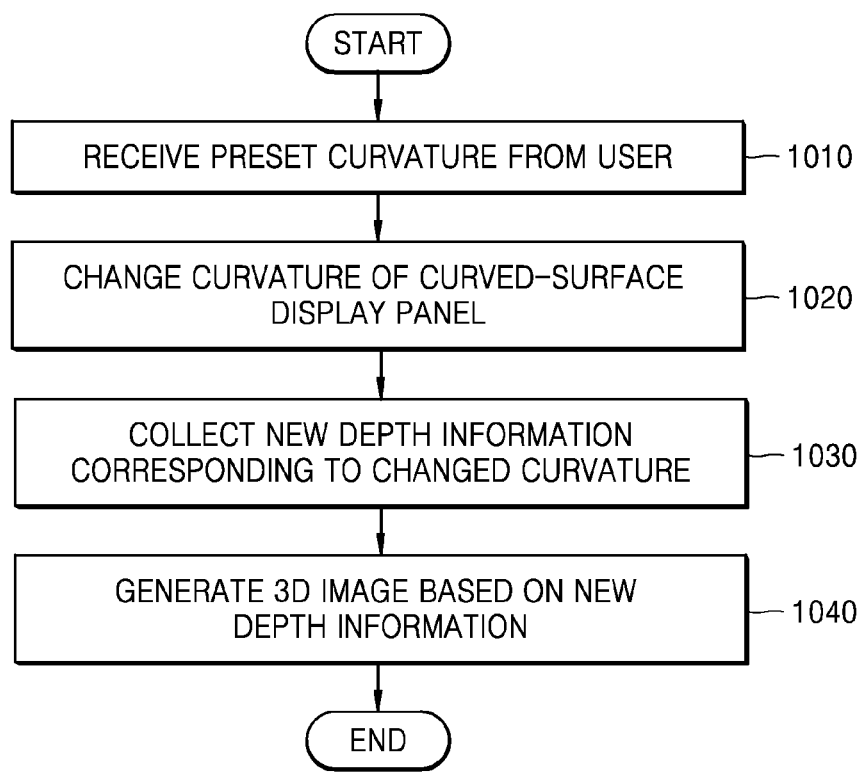
FIG. 10 is a flowchart illustrating an example method of generating a 3D image in a bendable display.

FIG. 10 is a flowchart illustrating an example method of generating a 3D image in a bendable display.

In operation 1010, the apparatus 500 for generating a 3D image may receive a preset curvature from a user. For example, a user may adjust a level of a curvature of a bendable display.

In operation 1020, a panel of a curved-surface display is bent to correspond to the input preset curvature and thus a curvature of the panel changes. When a curved-surface display panel is a display panel, the panel may be adjusted in the aforementioned manner.

In operation 1030, the apparatus 500 for generating a 3D image may collect new additional depth information corresponding to the changed curvature. The new additional depth information may, for example, be depth information with which an optimal and/or improved 3D effect is embodied taking into account the changed curvature. For example, the new additional depth information may include a ratio of a left depth level to a right depth level corresponding to a curvature of each area to embody a moderate 3D effect taking the changed curvature into account.

In operation 1040, the apparatus 500 for generating a 3D image may generate a 3D image based on the new additional depth information.

For example, the apparatus 500 for generating a 3D image may change existing additional depth information to the new additional depth information.

The apparatus 500 for generating a 3D image may, for example, adjust a depth level of left-eye image data and a depth level of right-eye image data using the changed additional depth information. For example, additional depth information on a curved-surface display is added to depth information on a flat-surface display, and then a depth level of left-eye image data and a depth level of right-eye image data may be adjusted to embody an optimal 3D image in the curved-surface display.

Figure 11B:
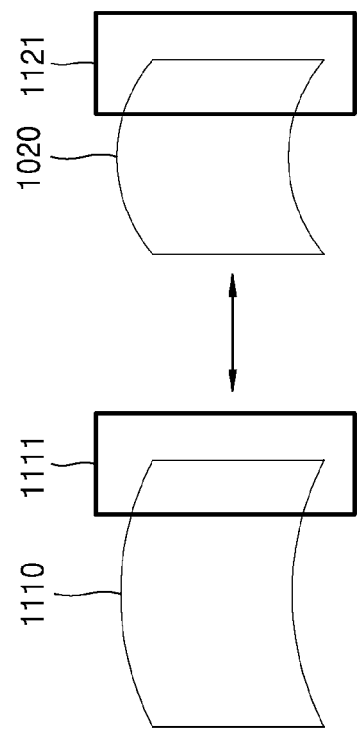
FIGS. 11A and 11B are diagrams illustrating an example change in additional depth information in a bendable display panel.
Figure 11A:
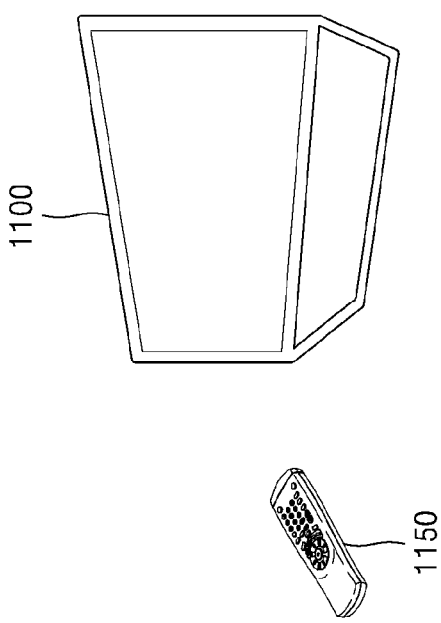

FIGS. 11A and 11B are diagrams illustrating an example change in additional depth information in a bendable display panel.

FIG. 11A illustrates a change in a curvature of a bendable display 3D TV 1100 when a command to convert to a large curvature mode is input.

When a command to convert to a large curvature mode is input via a remote controller 1150, a curved-surface display panel 1110 of the bendable display 3D TV 1100, having a small curvature may be bent more to have a large curvature.

Here, a right edge area 1111 of the curved-surface display panel 1110 may be bent more to have a large curvature.

The apparatus 500 for generating a 3D image according to an example embodiment may collect additional depth information including a ratio of a left depth level to a right depth level which is suitable for a preset curvature input by a user.

As a curvature increases, a deviation of ratios of a left depth level to a right depth level for embodying an optimum and/or improved 3D effect may increase. For example, as a curvature increases, a ratio of a left depth level to a right depth level for embodying an optimum 3D effect may change further away from 1:1.

The apparatus 500 for generating a 3D image may adjust a left depth level and a right depth level of a 3D image based on the collected additional depth information to move a left-eye image and a right-eye image, thereby embodying an optimum 3D effect.

Figure 12A:
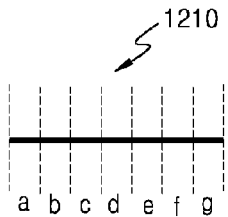
FIGS. 12A to 12C are diagrams illustrating an example change in additional depth information based on curvatures of a bendable display.
Figure 12B:
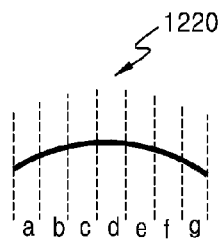
Figure 12C:
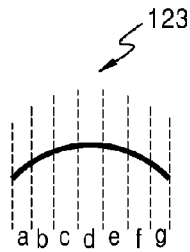

FIGS. 12A to 12C are diagrams illustrating examples of a change in additional depth information based on curvatures of a bendable display.

FIG. 12A illustrates a table of a bendable display under a curvature of 0% (e.g., flat) and a table illustrating example additional depth information corresponding to the curvature.

Curvatures in areas a to g are the same, and thus additional depth information are the same as 1:1. For example, a ratio of a left depth level to a right depth level for embodying, for example, an optimum 3D effect is maintained to be 1:1.

FIG. 12B illustrates a bendable display having a small curvature and a table illustrating example additional depth information corresponding to the small curvature.

As a curvature increases from area d to an outer area, a ratio of additional depth information also changes. For example, a difference between a left depth level and a right depth level is large in the outer area, for example, in areas a and g.

FIG. 12C illustrates a bendable display having a large curvature and a table illustrating example additional depth information corresponding to the large curvature.

A curved-surface display panel illustrated in FIG. 12C has larger curvatures than a curved-surface display panel illustrated in FIG. 12B. For example, a curvature dramatically increases toward an outer area of the curved-surface display panel, for example, toward areas a and g. As a result, a difference in ratios of a left depth level to a right depth level also dramatically increases.

Figure 13:
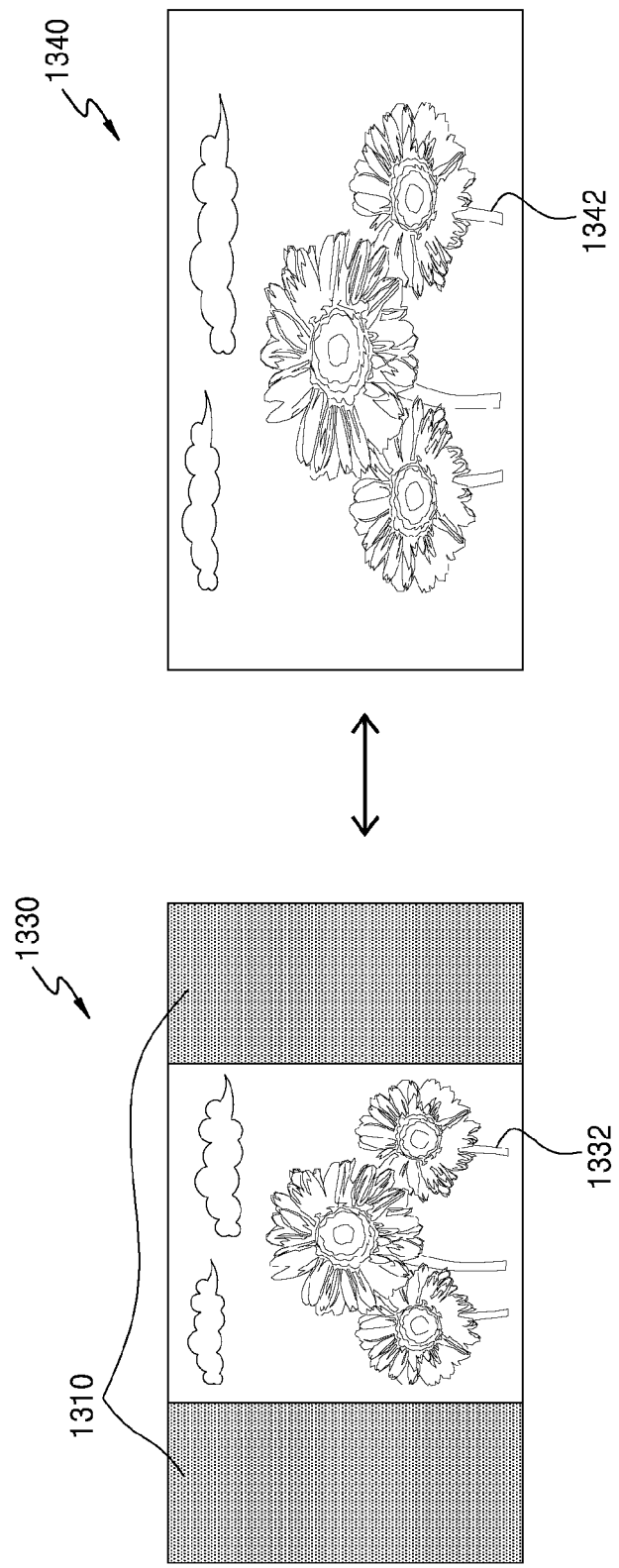
FIG. 13 is a diagram illustrating an example change in additional depth information caused by a change in an aspect ratio of an image in a curved-surface display.

FIG. 13 is a diagram illustrating an example change in additional depth information caused by a change in an aspect ratio of an image in a curved-surface display.

Referring to FIG. 13, a left curved-surface display panel 1330 having a ratio of 21:9 may reproduce a broadcast screen having a ratio of 4:3 as it is, i.e. the ratio of 4:3, and leave a peripheral portion 1310 of the left curved-surface display panel 1330 to be black.

A right curved-surface display panel 1340 may change a broadcast screen having a ratio of 4:3 to a broadcast screen having a ratio of 21:9 to reproduce and display an image.

In this case, the broadcast screen expands to the peripheral portion 1310 of the left curved-surface display panel 1330, and thus the aforementioned additional depth information may change.

For example, an image of a right flower 1342 of the right curved-surface display panel 1340 is located closer to an edge of a curved-surface display panel than an image of a right flower 1332 of the left curved-surface display panel 1330. In this regard, a different depth may be applied to the image of the right flower 1342 located close to the edge.

According to an example embodiment, when a ratio of a broadcast screen changes, the apparatus 500 for generating a 3D image may apply different additional depth information to a 3D image. For example, when a ratio of a broadcast screen changes from 4:3 to 21:9, the apparatus 500 for generating a 3D image may adjust and apply a ratio of a left depth level to a right depth level.

According to an example embodiment, a ratio of a left depth level to a right depth level corresponding to a ratio of a broadcast screen such as 21:9, 16:9, or 4:3 may be experimentally preset, stored in a memory, and then collected by a controller.

Details with respect to a number of a curvature and additional depth information described herein are examples. An optimal and/or improved number to be actually applied may be determined by experimentation.

The example embodiments can be written as computer programs and can be implemented in digital computers that execute the programs using a non-transitory computer readable recording medium.

The computer-readable medium may include an arbitrary available medium accessible by a computer, and examples thereof include all volatile and non-volatile media and separable and non-separable media. Further, examples of the non-transitory computer-readable recording medium may include a computer storage medium and a communication medium. Examples of the computer storage medium include all volatile and non-volatile media and separable and non-separable medial, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While the disclosure has been illustrated and described with reference to example embodiments thereof, it will be understood by one of ordinary skill in the art that various changes in form and details may be made therein without departing from the spirit and scope of the disclosure as defined by the following claims. It will be understood that the examples described above are not limiting. For example, each component described in a single type may be executed in a distributed manner, and components described distributed may also be executed in an integrated form The scope of the disclosure is indicated by the claims rather than by the detailed description, and it should be understood that the claims and all modifications or modified forms drawn from the concept of the claims are included in the scope of the disclosure.

What is claimed is:

1. An apparatus for generating a three-dimensional (3D) image reproduced on a curved-surface display panel, the apparatus comprising:
   a controller configured to determine depth information including at least one ratio of a left depth level to a right depth level, based at least in part on at least one curvature of the curved-surface display panel; and
   an image processor configured to generate the 3D image reproduced on the curved-surface display panel using the determined depth information,
   wherein the at least one ratio of the left depth level to the right depth level is set based on the at least one curvature and an aspect ratio of the curved-surface display panel.

2. The apparatus of claim 1, wherein the left depth level and the right depth level are different from each other.

3. The apparatus of claim 1, wherein the at least one ratio of the left depth level to the right depth level is set to be different with respect to each area of plural areas of the curved-surface display panel.

4. The apparatus of claim 1, wherein the image processor is configured to horizontally move a left-eye image and a right-eye image of the 3D image to generate the 3D image using the at least one ratio of the left depth level to the right depth level.

5. The apparatus of claim 1, wherein a curvature of the curved-surface display panel is changeable, and further comprising:
   a user interface configured to receive an input of a preset curvature,
   wherein the controller is configured to determine depth information corresponding to the input preset curvature, and
   the image processor is configured to adjust the left depth level and the right depth level of the 3D image based on the determined depth information corresponding to the preset curvature.

6. A method of generating a three-dimensional (3D) image reproduced on a curved-surface display panel, the method comprising:
   determining depth information including at least one ratio of a left depth level to a right depth level, based at least in part on at least one curvature of a curved-surface display panel; and
   generating a 3D image reproduced on the curved-surface display panel using the determined depth information,
   wherein the least one ratio of the left depth level to the right depth level is set based on the at least one curvature and an aspect ratio of the curved-surface display panel.

7. The method of claim 6, wherein the left depth level and the right depth level are different from each other.

8. The method of claim 6, wherein the least one ratio of the left depth level to the right depth level is set to be different with respect to each area of plural areas of the curved-surface display panel.

9. The method of claim 6, wherein in the generating of the 3D image, the 3D image is generated by horizontally moving a left-eye image and a right-eye image of the 3D image using the least one ratio of the left depth level to the right depth level.

10. The method of claim 6, wherein, the curvature of the curved-surface display panel is changeable, and the method further comprises
    inputting a preset curvature;
    determining depth information corresponding to the input preset curvature;
    adjusting the left depth level and the right depth level of the 3D image based on the determined depth information corresponding to the preset curvature.

11. A non-transitory computer-readable recording medium for recording a program which, when executed by a processor, performs the method of claim 6.

12. A non-transitory computer-readable recording medium having recorded thereon a program which when executed by a processor performs the method of claim 10.

13. A non-transitory computer-readable recording medium having recorded thereon a program which when executed by a processor performs the method of claim 7.

14. A non-transitory computer-readable recording medium having recorded thereon a program which when executed by a processor performs the method of claim 8.

15. A non-transitory computer-readable recording medium having recorded thereon a program which when executed by a processor performs the method of claim 9.

\* \* \* \* \*